Figure 1:
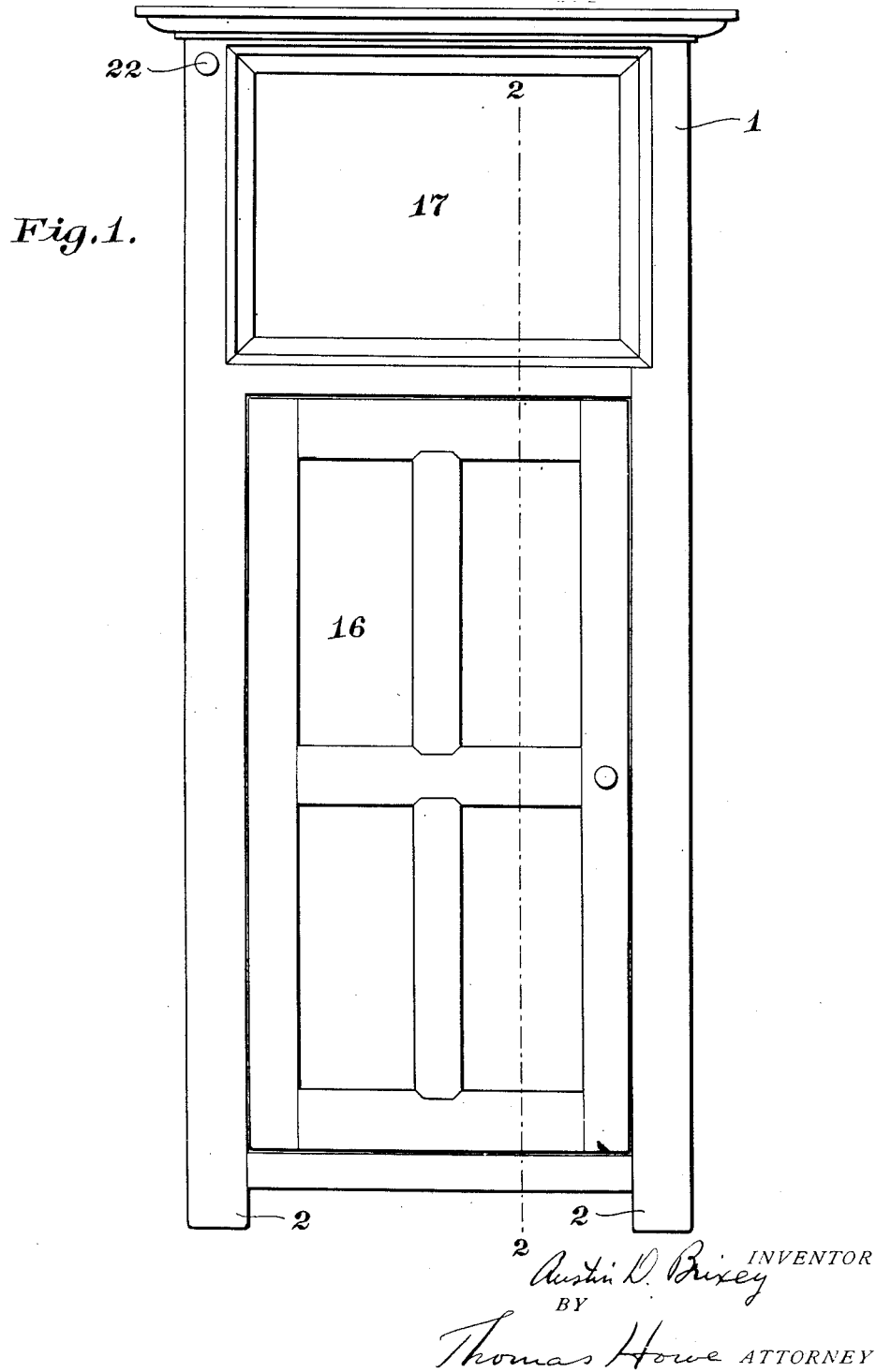

June 15, 1926.

A. D. BRIXEY

MOVING PICTURE APPARATUS

Original Filed July 18, 1919   2 Sheets-Sheet 1

1,588,935

INVENTOR
Austin D. Brixey
BY
Thomas Howe ATTORNEY

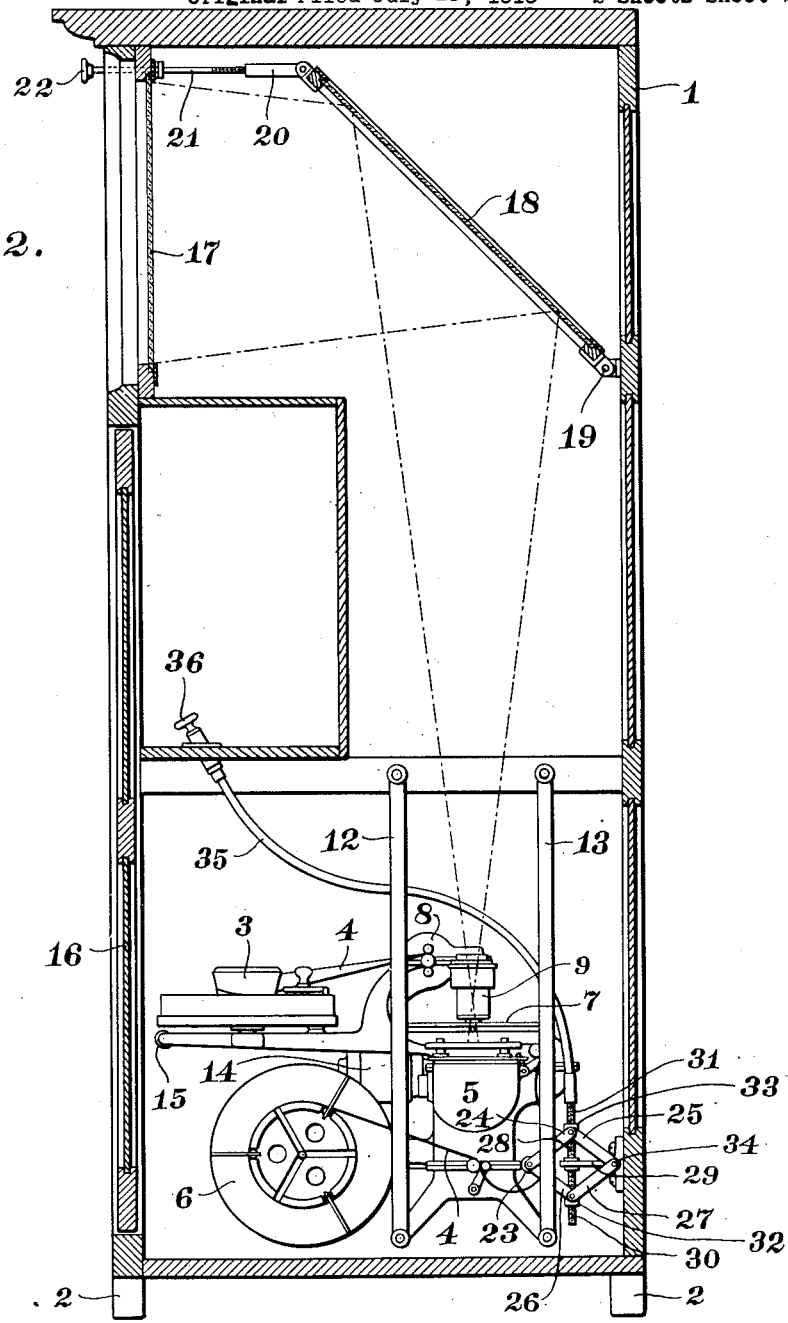

Patented June 15, 1926.

UNITED STATES PATENT OFFICE.

1,588,935

AUSTIN D. BRIXEY, OF GREENWICH, CONNECTICUT, ASSIGNOR TO THE REPLITURA CORPORATION, A CORPORATION OF NEW YORK.

MOVING-PICTURE APPARATUS.

Application filed July 18, 1919, Serial No. 311,717. Renewed October 23, 1925.

This invention relates to the arrangement of moving picture apparatus whereby the light receiving and transmitting parts may be properly related to each other.

The main object of the invention is to so adjust the projected light with relation to the picture screen that the picture will be located in the desired position upon the screen, means being provided for securing the adjustment after it has been made.

An ancillary object of the invention, where a deflecting means for the projected light is interposed between the projector and screen, is to provide means for relatively adjusting the deflecting means.

Other objects will appear hereinafter.

In the accompanying drawings, which illustrate the invention—

Fig. 1 is a front elevation of a moving picture cabinet, embodying the invention; and Fig. 2 is a vertical section on the line 2—2 of Fig. 1.

Referring to the drawings, the apparatus comprises a cabinet 1 of greater height than width as appears clearly from the drawings, and standing upon the feet 2. Within the cabinet is supported the moving picture apparatus comprising a paying out reel 3 for the film 4, which passes in front of the projector of which 5 is the lamp house, and thence on to the take up reel 6. The revolving shutter 7 is supported from the arm 8 which also supports the lens carrier 9. The apparatus is actuated by means of an electric motor 14. This apparatus is supported by means of four links or arms as 12 and 13 which are pivoted to the sides of the cabinet and to the picture apparatus, the other two arms are on the other side of the picture apparatus and hence not shown. It will thus be seen that the moving picture apparatus as a unit may be moved back and forth upon the pivoted arms by which it is suspended. At the forward portion of the apparatus may be provided a handle 15 which may be grasped to pull the apparatus outwardly. The door 16 is provided in the front of the cabinet and may be opened to permit the apparatus to move out to the front of the cabinet for changing the film or for other purposes. Mounted in the front wall of the cabinet is a picture screen 17 of the transmission type, that is to say, the light is transmitted from the projector through the screen to the eye of the observer. This screen may be of various constructions, but that shown in my Patent No. 1,204,401 of November 14th, 1916, or in my Patent No. 1,269,046 of June 11th, 1918, is well adapted for the purpose.

It will be seen that the light rays from the projector are projected upwardly along the greater dimension of the cabinet and impinge upon the mirror 18 whence they are reflected to the picture screen. The dot and dash lines indicate the course of the light rays. In order that the pictures should properly appear upon the screen, or, in other words, should be properly "framed" thereon, the screen, mirror and projector should be in proper relative adjustment.

Means is provided for adjusting the mirror by pivotly mounting it at 19 upon the cabinet and at its other end pivotly securing it to a screw threaded sleeve 20 within which, and in screw threaded engagement with it, is a screw threaded end of a rod 21 rotatably mounted in the frame and extending to the exterior of the cabinet where it may be provided with a milled button 22 to facilitate its turning by the fingers. It will be seen that by turning the rod 21 in one direction or the other, the top of the mirror will be pushed back and forth, the mirror turning upon its pivot 19 and so altering the angles which it makes with the projected light rays and consequently varying the position of the picture upon the screen.

Also the projector may be adjusted so as to alter the position of the picture upon the screen by the following means. When in its position of operation, the moving picture apparatus which is suspended by the links as already referred to, comes against a roller 23 which is carried by the double toggle or lazy tongs arrangement of the links 24, 25, 26 and 27. The rod 28 is rotatably mounted in the arm 29 extending from the wall of the cabinet and upon one side of its point of support is a screw thread 30 and upon the other side of its support is a screw thread 31. Upon these screw threads are respectively mounted the nuts 32 and 33. The two threads are opposite, that is to say, one is right hand and the other is left hand so that upon the turning of the rod 28 in one direction both nuts will move inwardly toward the support and when the rod is turned in the other direction the nuts will move away from each other. The knees of the toggles are respectively pivoted to these nuts as shown. The links 25 and 27 are also pivoted to the cabinet at 34. The result is that by turning the rod 28, which may be accomplished by means of the flexible shaft 35 to which is secured the turning button 36 rotatably mounted in the wall of the cabinet, the lazy tongs is either lengthened or shortened so that the distance of the projector from the back of the cabinet may be adjusted and it will also be adjusted with relation to the mirror and the picture screen.

While the invention has been illustrated in what is considered its best application, it may have other embodiments without departing from its spirit and is not therefore limited to the structures shown in the drawings.

What I claim is:

1. The combination with a cabinet of a picture screen thereon and a projector therein, said projector and screen being relatively adjustable transversely to the projected light rays.

2. The combination with a cabinet of a picture screen thereon and a projector therein, said projector and screen being relatively adjustable transversely to the projected light rays and means for holding the said screen and projector in different positions of relative adjustment.

3. The combination with a cabinet of a picture screen thereon and a projector therein, said projector and screen being relatively adjustable transversely to the projected light rays and means for adjusting the relative positions of said screen and projector.

4. The combination with a cabinet of a picture screen thereon and a projector therein, said projector and screen being relatively adjustable transversely to the projected light rays and means for adjusting the relative positions of said screen and projector extending to one side of the cabinet.

5. The combination with a cabinet of a moving picture screen stationarily mounted in a vertical wall thereof, a projector within said cabinet, means for pivotally suspending said projector, a pivotally mounted mirror for deflecting the light rays to said screen, means extending to one side of the cabinet for adjusting said mirror about its pivot and means extending to one side of the cabinet for adjusting the position of said projector within the cabinet.

In testimony whereof I have signed this specification this 14th day of July, 1919.

AUSTIN D. BRIXEY.